US010178566B2

(12) United States Patent
Guttenfelder et al.

(10) Patent No.: US 10,178,566 B2
(45) Date of Patent: Jan. 8, 2019

(54) RADIO ACCESS NETWORK (RAN) CELL SITE DIAGNOSTIC TEST TOOL SYSTEM AND METHOD

(71) Applicant: TELEFONAKTIEBOLAGET LM ERICSSON (PUBL), Stockholm (SE)

(72) Inventors: Ken Guttenfelder, Frisco, TX (US); Frank Mikolic, Ottawa (CA); Finn Aaron Magnusson, Stockholm (SE); Ulf Erik Ekstedt, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/846,072

(22) Filed: Dec. 18, 2017

(65) Prior Publication Data

US 2018/0220312 A1   Aug. 2, 2018

Related U.S. Application Data

(60) Provisional application No. 62/451,290, filed on Jan. 27, 2017.

(51) Int. Cl.
| | |
|---|---|
| *H04M 1/24* | (2006.01) |
| *G01S 19/23* | (2010.01) |
| *H04L 12/26* | (2006.01) |
| *H04W 24/06* | (2009.01) |
| *H04W 24/10* | (2009.01) |
| *H04W 16/22* | (2009.01) |
| *H04W 24/04* | (2009.01) |

(52) U.S. Cl.
CPC ............. *H04W 24/06* (2013.01); *G01S 19/23* (2013.01); *H04L 43/0817* (2013.01); *H04M 1/24* (2013.01); *H04W 24/10* (2013.01); *H04W 16/22* (2013.01); *H04W 24/04* (2013.01)

(58) Field of Classification Search
CPC ..... H04W 24/08; H04W 88/08; H04W 24/02; H04W 24/04; H04W 24/06; H04W 24/00; H04L 41/06
See application file for complete search history.

(56) References Cited

U.S. PATENT DOCUMENTS 9,503,922 B1 * 11/2016 Ford ...................... H04W 28/08
2006/0063521 A1 * 3/2006 Cheung ................... H04L 41/06
455/423

* cited by examiner

*Primary Examiner* — Nam T Huynh

(57) ABSTRACT

A radio access network (RAN) cell site field test tool with a mobile application extension wherein a diagnostic function can be invoked automatically based on preconfigured event criteria or can be initiated remotely by a preregistered human or machine user. Example diagnostic functions may include the ability to test one or all the following functional/structural subsystems of a RAN cell site infrastructure comprising: fronthaul components, backhaul components, baseband components, GPS/location components, transceiver components, antenna components, enclosure/chassis components, internal monitoring components, cooling/AC and other ambient climate control components, environmental/regulatory compliance components, and power components.

15 Claims, 12 Drawing Sheets

LEGEND 807

REPORT FIELDS 808

| Item | Description |
|---|---|
| Site Name | Name of the LTE RAN System |
| Type | Link Type – O (Optical) Or E (Electrical) |
| RiLink | RiLink Managed Object Reference |
| Near End-Board1 | Near End – Board1 Product Type |
| Near End-Port1 | Near End – Port1 Managed Object Reference |
| Far End-Board2 | Far End – Board1 Product Type |
| Far End-Port2 | Far End – Port1 Managed Object Reference |
| Cell or Link Impacted | Cell or Link that is impacted by RiLink |
| Status/ Issue Type | Test Status |
| Issue Details | Issue Details |

Status Field 810

| Item | Description |
|---|---|
| OK | Passed Test Result |
| SFP Config | Failed Result – Near End or Far End SFP configuration Issue |
| Alarmed Issue | Failed Result – Alarmed Issue (See alarm in additional Text) |
| Link Power Budget | Failed Result – Fiber – Excessive Optical Power Loss Detected |
| Link Power Budget And Bit Errors | Failed Result – Fiber – Excessive Optical Power Loss Detected |
| Bit Errors | Failed Result – Fiber – Bit Errors Detected |

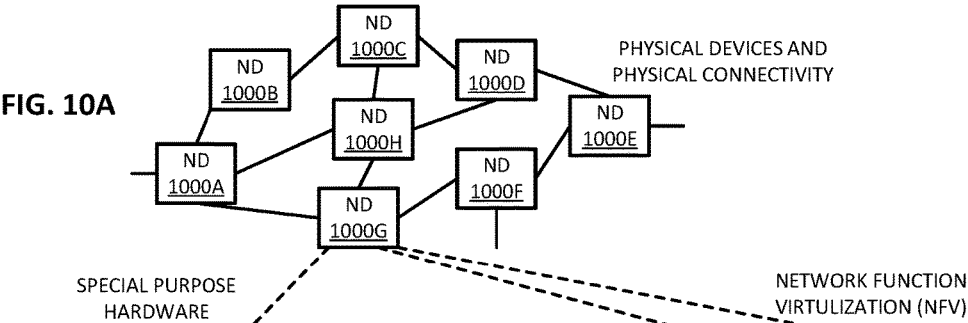
FIG. 10A
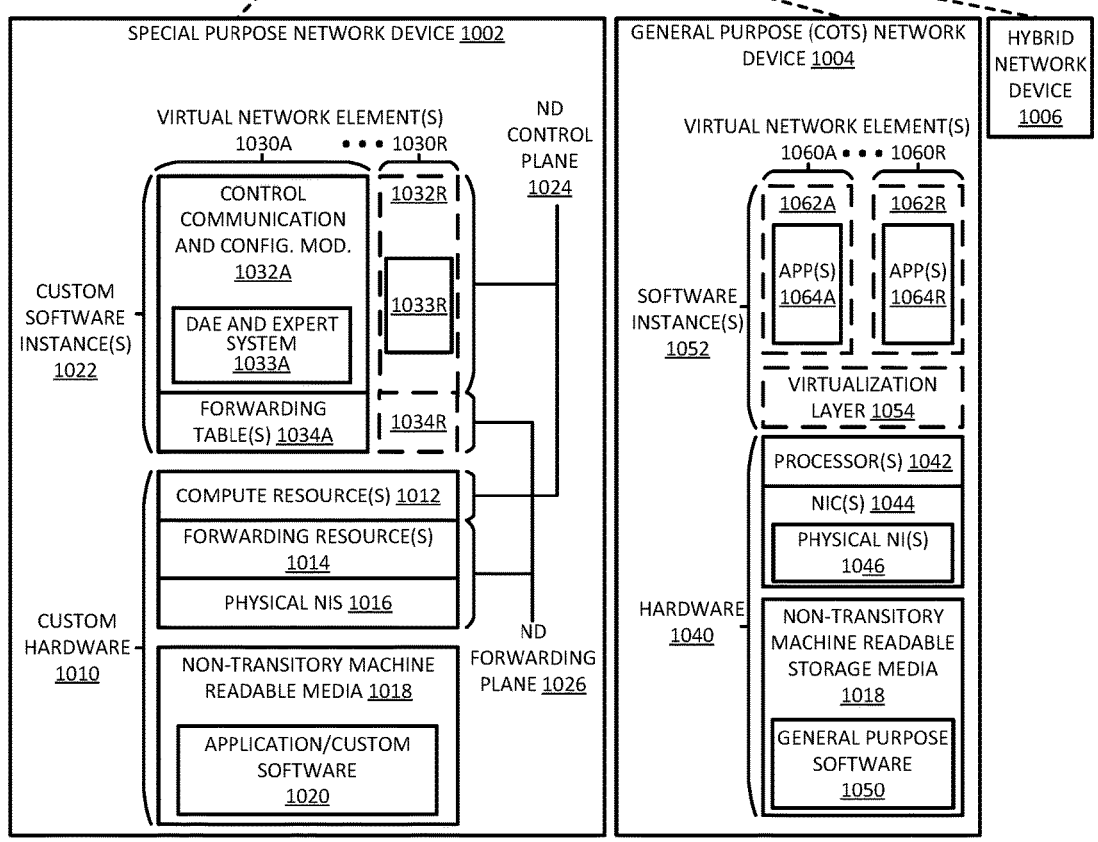
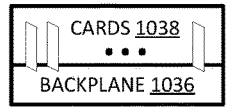
FIG. 10B

US 10,178,566 B2

RADIO ACCESS NETWORK (RAN) CELL SITE DIAGNOSTIC TEST TOOL SYSTEM AND METHOD

PRIORITY UNDER 35 U.S.C. § 119(e) & 37 C.F.R. § 1.78

This nonprovisional application claims priority based upon the following prior United States provisional patent application(s): (i) "METHOD AND APPARATUS FOR DIAGNOSING, ANALYZING AND REPORTING STATUS OF RADIO ACCESS NETWORK (RAN) FIELD SITE EQUIPMENT," Application No.: 62/451,290, filed Jan. 27, 2017, in the name(s) of Ken Guttenfelder, Frank Mikolic, Finn Aaron Magnusson and Ulf Erik Ekstedt; each of which is hereby incorporated by reference in its entirety.

TECHNICAL FIELD

The present disclosure generally relates to diagnostic tools for communications network infrastructure. More particularly, and not by way of any limitation, the present disclosure is directed to a radio access network (RAN) cell site diagnostic test tool system and method operative with respect to the status and operation of equipment found at RAN cell sites.

BACKGROUND

Test equipment currently available to cell site field crews and installers for optical fiber based installations and other RAN cell site equipment include handheld tools such as an optical power meter, optical fiber scope and optical time-domain reflectometer (OTDR). While handheld tools such as these can provide a number of on-site troubleshooting benefits they also have certain limitations from an operational perspective. For instance, these tools require that testing be performed on site at either site level or at tower top. Further, field testing is intrusive and can cause service disruptions.

Whereas advances in RAN deployment architectures continue to grow apace, with concomitant developments in handheld cell site test tools, several lacunae remain in the field of RAN diagnostic tools, thereby requiring further innovation as will be set forth hereinbelow

SUMMARY

The present patent disclosure is broadly directed to systems, methods, apparatuses, devices, and associated non-transitory computer-readable media and network architecture for effectuating a RAN cell site test tool system and method operative in a cloud-based application service environment.

In one aspect, an embodiment of the present invention comprises a RAN cell site field test tool with a mobile application extension wherein a diagnostic function can be invoked automatically based on preconfigured event criteria or can be initiated remotely by a preregistered human or machine user. Example diagnostic functions may be configured to one or all the following functional/structural subsystems of a RAN cell site infrastructure comprising: fronthaul components, backhaul components, baseband components, GPS/location components, transceiver components, antenna components, radio components, enclosure/chassis components, internal monitoring components, cooling/AC and other ambient climate control components, environmental/regulatory compliance components, and power components, among others. The results from each test report generated by the diagnostic functions may be transmitted to and received by the user in a report format that can be interpreted from a mobile device. The reports may also be tracked in a database for operational and quality measurement monitoring and reporting.

In another aspect, an embodiment of a RAN site test tool system is disclosed, which comprises, inter alia, a diagnostic analytics engine configured to execute one or more diagnostic functions on a RAN cell site infrastructure responsive to at least one of an input from an authorized test tool user entity and one or more automated event criteria triggers preconfigured with respect to at least a portion of the RAN cell site infrastructure. A domain knowledgebase engine operative to apply a plurality of cause correlation and determination rules is also included with respect to measurements obtained from executing the one or more diagnostic functions on the RAN cell site infrastructure.

In another aspect, an embodiment of a RAN test tool terminal node is disclosed. The claimed embodiment comprises, inter alia, a processor; a network interface; a display; and a persistent memory coupled to the processor and having instructions thereon for performing the following acts when executed by the processor: effectuating a secure connection via the network interface to a RAN cell site test tool system that comprises a diagnostic analytics engine configured to execute a plurality of diagnostic functions on one or more RAN cell site infrastructures; authenticating with the RAN cell site test tool system and obtaining authorization to remotely perform at least a subset of the diagnostic functions on a select RAN cell site infrastructure; and receiving a summary of results from the RAN cell site test tool system with respect to measurements obtained from executing the at least a subset of the diagnostic functions. In one implementation, the results may be presented via a portal view realized at the display, wherein the results are determined by the RAN cell site test tool system based on applying a plurality of cause correlation and threshold rules pertaining to one or more subsystems of the select RAN cell site infrastructure including fronthaul components, backhaul components, GPS components, baseband components, radio components, transceiver components, antenna components, enclosure and chassis components, and power components, among others.

In a still further aspect, an embodiment of the present invention comprises a non-transitory machine-readable storage medium that provides instructions that, if executed by a processor, will cause a processor to perform operations comprising: execute one or more diagnostic functions on a RAN cell site infrastructure responsive to at least one of an input from an authorized test tool user entity and one or more automated event criteria triggers preconfigured with respect to at least a portion of the RAN cell site infrastructure; and apply a plurality of cause correlation and determination rules with respect to measurements obtained from executing the one or more diagnostic functions on the RAN cell site infrastructure.

In still further aspects, an embodiment of a system, apparatus, or network element is disclosed which comprises, inter alia, suitable hardware such as processors and persistent memory having program instructions for executing an embodiment of the methods set forth herein.

In still further aspects, one or more embodiments of a non-transitory computer-readable medium or distributed media containing computer-executable program instructions or code portions stored thereon are disclosed for performing one or more embodiments of the methods of the present invention when executed by a processor entity of a network node, apparatus, system, network element, subscriber device, and the like, mutatis mutandis. Further features of the various embodiments are as claimed in the dependent claims.

By providing a network-based RAN cell site test tool system according to the teachings herein several advantages may be realized in an embodiment of the present invention, including but not limited to: (1) security of tower/field crew and/or third-party contractors can be enhanced because of the ability to request a diagnostic test report via a web portal from a remote site. As users do not have direct access to the OSS or mobile operator customer network, infrastructure integrity may be assured; (ii) real-time diagnostic testing can be initiated remotely by a mobile device that has Internet access; (iii) fronthaul testing can be performed on the end-to-end link using remote diagnostic routines instead of in-line methods, thereby eliminating the risk of issues being introduced due to contamination from incorrect fiber handling; (iv) multi-component diagnostic routines can be autonomously executed in the same session; (v) analytics may be configured to provide anomaly detection, fault isolation, prioritization and classification, and actionable recommendations, etc., depending on service level agreements and diagnostics management contracts, and the like.

Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 8A and 8B depict an example fronthaul diagnostics test report in an embodiment of the present invention;

FIGS. 10A/10B illustrate connectivity between network devices (NDs) within an exemplary cloud-based service network, as well as three exemplary implementations of the NDs, according to some embodiments of the present invention.

DETAILED DESCRIPTION

Figure 1:
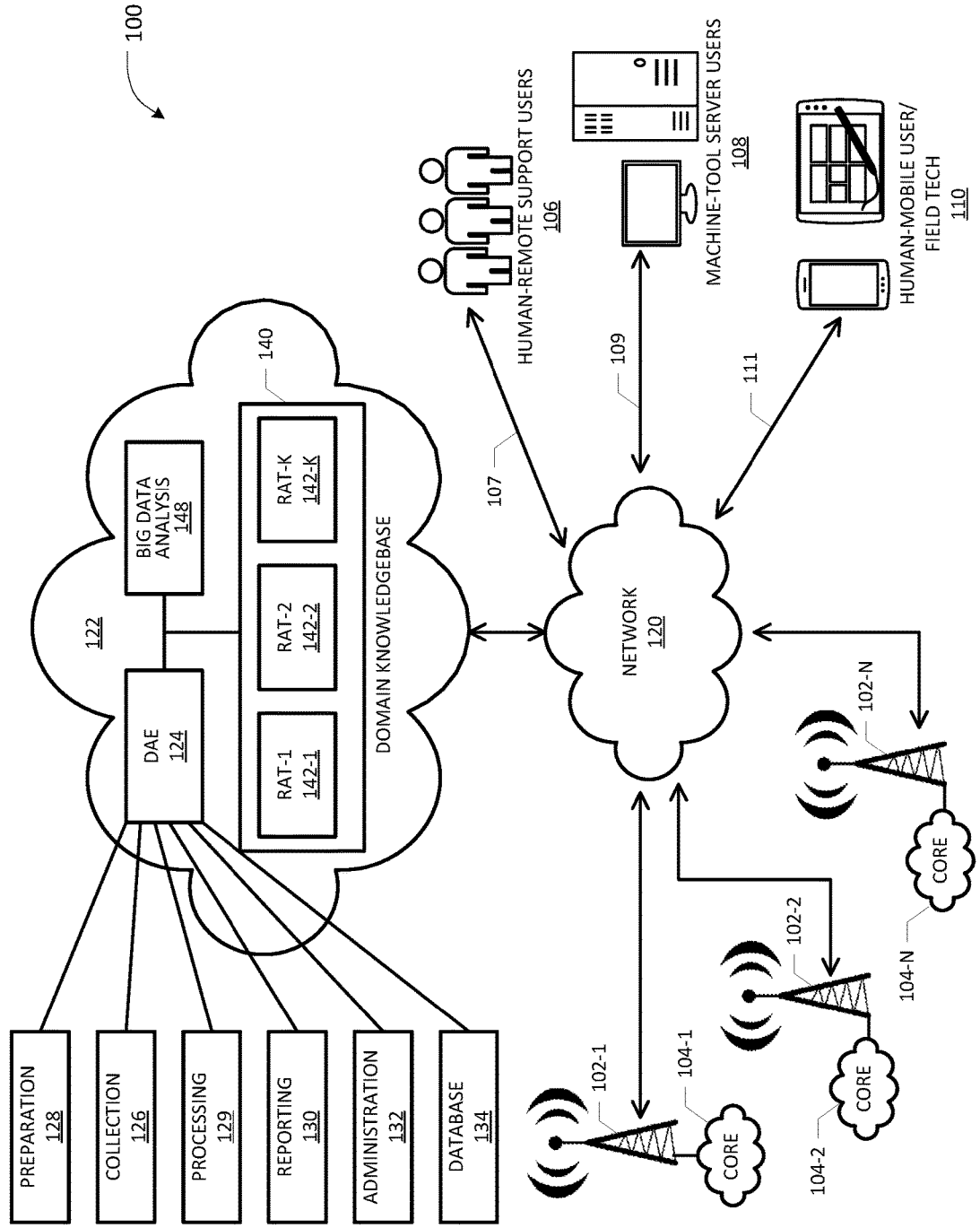
FIG. 1 depicts a generalized example network environment wherein an embodiment of the present invention may be practiced for effectuating RAN cell site diagnostics test management with respect to one or more RAN cell sites with different radio access technology (RAT) infrastructures.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element may be programmed for performing or otherwise structurally arranged to perform that function.

As used herein, a network element (e.g., a router, switch, bridge, etc.) is a piece of networking equipment, including hardware and software that communicatively interconnects other equipment on a network (e.g., other network elements, end stations, etc.). Some network elements may comprise "multiple services network elements" that provide support for multiple networking functions (e.g., routing, bridging, switching, Layer-2 aggregation, session border control, Quality of Service, and/or subscriber management, and the like), and/or provide support for multiple application services (e.g., data, voice, and video). Subscriber/test user end stations, e.g., comprising servers, workstations, laptops, netbooks, palm tops, mobile phones, smartphones, multimedia phones, other portable user equipment, terminals, etc., tethered (wired) or untethered (wireless), may be configured to access, launch or consume resources/services, including cloud-centric services and applications, provided over a packet-switched wide area public network such as the Internet via suitable service provider access networks, wherein a cloud-based RAN cell site diagnostics system or service may be provided according to one or more embodiments set forth hereinbelow. Subscriber/test user end stations may also access or consume resources/services provided on virtual private networks (VPNs) overlaid on (e.g., tunneled through) the Internet. Typically, subscriber/test user end stations may be coupled (e.g., through customer/tenant premise equipment or CPE/TPE coupled to an access network (wired or wirelessly)) to edge network elements, which are coupled (e.g., through one or more core network elements) to other edge network elements, and to cloud-based data center elements with respect to consuming hosted resources/services according to service management agreements, access level privileges, authorization/authentication protocols, etc.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is a generalized example network environment 100 wherein an embodiment of the present invention may be practiced for effectuating RAN cell site diagnostics test management with respect to one or more RAN cell sites that may have different radio access technology (RAT) infrastructures. By way of illustration, a plurality of RAN cell sites 102-1 to 102-N, each of which may be coupled to one or more or none of core wireless, mobile or radio network architectures depending on deployment, network configuration and access technology, are exemplified in the example network environment 100. Further, depending on coverage area, number of radio users, spectrum utilization, power requirements, etc., example RAN cell sites 102-1 to 102-N may comprise wide area cellular macrocells as well as various types of small cells including femtocells, picocells, and microcells (e.g., low-powered radio access nodes). Thus, an example cell site may include infrastructure equipment operative to serve an area ranging from roughly a few tens of meters to a mile in diameter, e.g., in the case of a small cell, to a mobile macrocell having a range of about 20 miles. Accordingly, example cell sites may be deployed in various geographical locations, e.g., rural, semirural, urban/suburban, metropolitan/conurbation settings, and the like, and may be configured to operate with a variety of RATs using any combination of licensed and/or unlicensed spectrum portions. By way of illustration, example cell sites may be comprised of one or more of the following RAT infrastructural elements including but not limited to: 1G/2G access network technologies, Global System for Mobile Communications (GSM) radio access network (GRAN) technology, Enhanced Data Rates for Global System for Mobile Communications (GSM) Evolution (EDGE) network (GERAN) technology, $3^{rd}/4^{th}/5^{th}$ Generation Partnership Project (3/4/5 GPP) network technology, Integrated Digital Enhanced Network (IDEN) technology, WiMAx technology, various flavors of Code Division Multiple Access (CDMA) network technology, heterogeneous access network technology, Universal Mobile Telecommunications System (UMTS) network technology, Universal Terrestrial Radio Access Network (UTRAN) technology, All-IP Next Generation Network (NGN) technology, and Long Term Evolution (LTE) technology, etc.

Furthermore, given the broad array of architectural advances in RAN implementations, an example cell site 102-1 to 102-N may comprise traditional all-in-one macro base stations coupled to antennas, base station subsystems (BSSs) including base transceiver stations (BTSs) associated with one or more base station controllers (BSCs), distributed base stations with remote radio heads (RRHs) or radio units (RUs) separated from baseband units (BBUs) by fiber, cloud or centralized RAN (C-RAN) infrastructures as well as virtualized RAN (V-RAN) infrastructures and RAN infrastructures for supporting heterogeneous networks. As an example RAN cell site diagnostics test management system of the present invention may be configured to operate with the infrastructural components of any of the foregoing RAN architectures, which components may be grouped into one or more functional/structural subsystems, compartments, or partitionings for purposes of an embodiment, an overview of a RAN cell site is briefly set forth immediately below.

In one example arrangement, a RAN cell site may comprise a BSC/BTS system having facilities such as power, cooling, backup battery, monitoring, environmental surveillance, etc., with suitable RF radio units for generating RF signals that may be transmitted by RF cables to one or more antennas on top of a tower. Suitable backhaul transportation equipment may be included for interconnecting the cell site to a core network node such as a mobile switching center (MSC) or mobile switching telephone office (MTSO). Functionally, a BBU subsystem is provided for processing user and control data, which may be co-located with and coupled to the RUs used for generating the radio signals. In another arrangement involving centralized baseband controllers, a BBU subsystem may be separated from RU/RRH functional blocks, where digital radio over fiber fronthaul connectivity is provided therebetween for facilitating carriage of digital baseband signals using, e.g., coarse or dense wavelength division multiplexing (CWDM/DWDM) technology as set forth according to the Open Base Station Architecture Initiative (OBSAI) and Common Public Radio Interface (CPRI) standards. In some arrangements, fronthaul links based on CPRI may span over several kilometers, and the equipment may be configured to be compatible with low-cost and ubiquitous small form-factor pluggables (SFP/SFP+), e.g., hot-pluggable transceivers modules that can plug into the SFP port of a network switch operative with SONET, Gigabit Ethernet, Fibre Channel, and other communications standards. In addition to the fronthaul equipment, the foregoing RAN cell site arrangements also include suitable backhaul equipment for core network connectivity similar to the other arrangements as noted above. By way of illustration, the example network environment 100 of FIG. 1 exemplifies one or more RAN cell sites 102-1 to 102-N that may be connected to one or more core networks 104-1 to 104-N via backhaul connections in known manner.

In accordance with the teachings of the present patent application, a RAN cell site test tool system 122 may be provided as a network-centric or cloud-based service platform wherein a diagnostic analysis engine (DAE) 124 may be configured to execute one or more diagnostic/test functions in a remote manner on a select RAN cell site infrastructure on behalf of one or more authorized test tool entities. Broadly, embodiments of the RAN cell site test tool system 122 of the present invention involve a service architecture comprising one or more electronic devices coupled to a network server that may be configured to allow a user to request a diagnostic test report via a web portal service connection (e.g., remote user interface such as a web browser running SSL) with respect to a selected RAN cell site operated by a mobile network operator. In one arrangement, the connection may be effectuated using a public IP network such as the Internet, a private or enterprise IP network, an Intranet, and/or any combinations thereof, using any combination of wired or wireless technologies for accessing network-based sources, services or application, wherein HTTP, secure HTTP, etc. protocols may be employed. In one arrangement, appropriate functionality, embodied by hardware, software or firmware, may be configured such that the RAN cell site tool system can restrict a user from accessing higher level layers of a mobile network architecture such as, e.g., network operations center (NOC) operations, Operations Support Systems (OSS) and/or Business Support Systems (BSS) (together often abbreviated as O/BSS or B/OSS), etc., while authorizing the user to select applicable diagnostic modules with respect to one or more selected RAN cell sites. In a further arrangement, an embodiment of the RAN cell site tool system of the present invention may allow real-time diagnostic testing initiated remotely by the electronic device such as a mobile device that has Internet access. Whether the RAN cell site tool system is accessed via wired means or wireless means, or by human technicians or machine agents, an embodiment of the present invention may therefore be configured to facilitate non-intrusive diagnostic testing without causing service disruptions (e.g., by actual field technicians performing on-site field testing and diagnostics) and generate comprehensive consolidated system diagnostic status reports.

To facilitate the various aspects of an example embodiment of the RAN cell site tool system 122, DAE 124 may be configured with subsystems, apparatuses, modules, mechanisms, functionalities or blocks that may be compartmentalized, partitioned or modularized into the following: (i) data collection 126; (ii) preparation 128; (iii) processing 129; (iv) reporting 130; (v) administration 132; and (vi) one or more database(s) 134. A domain knowledgebase engine 140 may also be provided in conjunction with DAE 124 wherein various RAT-specific rules, cause determinations, etc., which may be adaptively learned for different subsystems of the RAN cell sites, can be configured to be invoked at several stages of performing diagnostic tests on a particular RAN cell site, e.g., configuring the tests, processing of data measurements obtained from executing the tests, etc. By way of illustration, domain knowledgebases for RAT-1 142-1 to RAT-K 142-K are exemplified as part of the of the RAN cell site tool system 122, which may comprise without limitation any of the RATs set forth hereinabove that may be operative with one or more RAN cell sites 102-1 to 102-N. In a further variation, a Big Data analysis engine 148 may also be provided for leveraging Big Data analysis that may be available with respect to the network infrastructure conditions, RAN cell site usage statistics, types of test tool users or entities, weather/environmental forecasting, and the like, in order to further modulate applicable diagnostic tests, functions and/or processing of the data measurements, as well as facilitating adaptive trainability of DAE 124 and/or the RAT-specific domain knowledgebase 140 based on machine learning, input from human domain experts, neural networks, fuzzy logic, predictive adaptive learning, pattern recognition, etc.

In the context of the foregoing, "Big Data" may be used as a term for a collection of data sets so large and complex that it becomes virtually impossible to process using conventional database management tools or traditional data processing applications. Challenges involving "Big Data" may include capture, curation, storage, search, sharing, transfer, analysis, and visualization, etc. Because "Big Data" available with respect to RAN cell site diagnostic data, user data, network conditions data, Internet-of-Things (IoT)-based sensor data gathered from RAN cell site subsystems, etc., can be on the order of several terabytes to petabytes to exabytes, it becomes exceedingly difficult to work with using most relational database management systems for optimizing, ranking, indexing, cross-correlating test/measurement data and status data in typical environments. Accordingly, in one arrangement, the Big Data analysis 148 and RAT domain knowledgebase 140 may be implemented in a machine learning framework that is optimized for storage and large-scale processing of data sets on clusters of commodity hardware.

Depending on how the service architecture of an example embodiment of the RAN cell site diagnostics/test tool system 122 is implemented, a variety of authorized test tool users or entities may be allowed to access DAE 124 and launch applicable diagnostic functions/tests on selected RAN cell sites. A plurality of human users 110 operating untethered mobile test tool terminals, e.g., laptop computers, mobile communications devices, palmtop computers, tablets, phablets, or customized remote field test equipment, etc., may access RAN cell site diagnostics/test tool system 122 using suitable wireless/radio/satellite communications networks 111 for initiating a suite of diagnostics functions upon authentication and authorization. In one arrangement, such users may be allowed only "low level" access in the sense that no OSS/BSS functionality of the mobile network associated with the selected RAN cell sites may be invoked. Another class of test tool user entities may comprise machine tool server users 108 such as, e.g., automated RAN tool machines executing on servers, desktops, etc., of a mobile network operator's enterprise network. Yet another class of test tool user entities may comprise NOC-based human remote support users 106, who in some arrangements may be allowed access to the mobile network's OSS/BSS.

Various functional and structural aspects of DAE 124 in an example embodiment of the RAN cell site test tool system 122 will be set forth in additional detail in the following sections.

With respect to the overall administration of test tool users, suitable registration, authentication and permissions based on test tool user entities may be provided as part of the administration block 132. A class of "technician" user entities may be authorized only for requesting a diagnostic report and review historical results for the RAN cell sites they have initiated diagnostics. A class of "advanced support" user entities may request diagnostic tests and review historical results for any site. At a still higher access level, a class of "quality management" user entities may be configured to request diagnostic tests and review historical results for any site as well as generate higher level data analysis, e.g., quality reports, etc., to measure operational performance. A scheduler block or process may be configured to effectuate the coordination of various types of diagnostic functions, e.g., routine, event driven and/or based on user invoked test requests. As used herein a "routine" is a scheduled diagnostic test on a preselected list of sites; and "event driven" is the autonomous execution of diagnostic testing on a RAN site or sites meeting a set of criteria (e.g., product configuration changes, alarmed faults and key performance indicators ("KPI's"), etc.). User-invoked diagnostics may involve on-demand or user (human or machine) invoked diagnostic testing performed on a selected site on a per request basis. Data collection module 126 may involve management of site access (for user-invoked or otherwise), logging/collection methods required for the execution of diagnostic test objects as well as capturing of diagnostic data measurements using suitable interfaces. Data collection 126 may also involve storage, curation and maintenance of diagnostic data measurements, results, etc., in one or more suitable databases.

Data preparation 128 may be broadly configured to effectuate preparation of the raw data, measurements, information etc., from the various subsystems of one or more selected RAN cell sites for processing. In one arrangement, one or more functional modules or blocks may be provided as part of data preparation/processing 128 including, without limitation, (i) a deconstruction analysis module for parsing or separation of multiple raw diagnostic data streams such as alarms data and configuration and performance data, in its native format such as structured, semi-structured or unstructured and breaking it down in to component pieces or fields; (ii) a summarization module for collation of similar data components together and performing statistical analysis therein such as, e.g., obtaining the median/mean and variance of a measured/monitored variable, e.g., optical power loss; (iii) a data aggregation module for combining related data points together in order to create a higher-level representation of the data such as, e.g., result output period (ROP) level performance data; (iv) a data loading module for loading external reference data that may be used as input to DAE 124, wherein such data may be read in and/or stored in a computer readable medium such as random access memory (RAM). Example data sources may include supported optical interfaces or transceivers such as SFP/SFP+ hardware (HW) combinations and alarm prioritization rules.

Analytic processing 129 may be configured as part of DAE 124 for effectuating various aspects of processing the collected site diagnostic test data, measurements, etc., and applying a suite of technology domain specific analytical metrics and generation of final analysis results. As noted previously, Big Data analytics 148 may be involved in conjunction with executing some of such functionalities. For example, techniques used to execute these functions may include MapReduce. MapReduce is a method for taking a large data set and performing computations on it across multiple computers, in parallel (e.g., massively parallel processing or MPP). It serves as a model for how to program, and may be used to refer to the actual implementation of this model. In one example implementation, MapReduce model may be comprised of two parts. A Map function may be configured for sorting and filtering, taking data and placing it inside a number of categories so that it can be analyzed. A Reduce function may be configured to provide a summary of the processed/categorized data by combining it all together. More specifically, the following subsections describe example flows and techniques that may be used in an implementation for providing advanced diagnostic insights with respect to the collected network data.

Anomaly Detection—Evaluate network diagnostic data to identify active indications of abnormal behavior such as, e.g., disabled devices and degraded performance based on preset thresholds.

Leading Indicator identification and grouping—The input diagnostic fields are grouped in relevance to the test objects being executed. Features are built by secondary processing such as max, min or combining multiple indicators. Leading Indicator identification and grouping may be configured as a process for deriving a list of inputs used by the machine learning algorithms that may be implemented in a learning/feedback module with respect to the various aspects of a RAN cell site test tool system. Leading Indicators, behaviors, performance measurements or performance results may be derived from the received diagnostic data, wherein one or more indicators or groups of indicators are typically further processed, calculated or combined using feature engineering and feature selection techniques. Feature engineering may be implemented as a process of utilizing the domain knowledge to create features which are applicable to the specific machine learning algorithms being deployed. Feature selection or grouping may be implemented as a process of selecting a subset of the features comprised of the most relevant features needed to optimize the machine learning algorithm's performance.

Analytical model execution—The leading indicator and features may be processed through one or more analytical model(s) by DAE 124 in order to perform various types of descriptive and predictive functions, wherein descriptive functions may be configured to isolate and detect the abnormal behavior(s) currently active using analytical and rule based logic, and prescriptive functions may be configured to use advanced analytical techniques to estimate the trends or prediction of abnormal events in the near future.

Classification Analysis—Classification and clustering techniques may be applied after the primary model(s) results are available. In one arrangement, one or more mathematical or statistical models, e.g., multivariate cluster analysis, principle component analysis, discriminant function analysis, regression analysis, analysis of variance (ANOVA), fuzzy logic, pattern recognition, etc., may be used to identify and assign the discovered events to their closest group or cluster, resulting in a list of one or more groups that contain events that share common traits. For example, a temperature increase in the radio unit could be clustered with a temperature alarm on the SFP. Clustering results may be analyzed by one or both of the following:

Issue Prioritization—Prioritization may be applied when multiple events are detected and are not correlated to each other. Metrics may be configured to identify one or more anomalies that may have a higher prioritization and/or impact to the network.

Cause and Effect Analysis—This technique may be applied when multiple events are detected and are highly correlated with each other. The output of this predictive model is a tree-based mapping of the events to identify a top level event that caused the other events.

An example embodiment of the RAN cell site test tool system 122 and associated DAE 124 may also include a database storage/server system 134 for storage of lifecycle diagnostic data, which may be acted upon by DAE 124 in some embodiments on a periodic scheduled basis. In addition, reporting module 130 of example embodiment of the RAN cell site test tool system 122 and associated DAE 124 may be configured to provide real time reporting for on-demand and/or periodic diagnostic testing, as well as for various quality management charts and reports. For example, multiple reporting outputs, formats, graphical or otherwise, may be made available, which in an embodiment may be generated on a service subscription basis. Further, a variety of methods may be configured by which such diagnostic results can be distributed to an end user, including but not limited to e-mail, via a web portal, mobile application, machine-to-machine communication, and the like.

Figure 2:
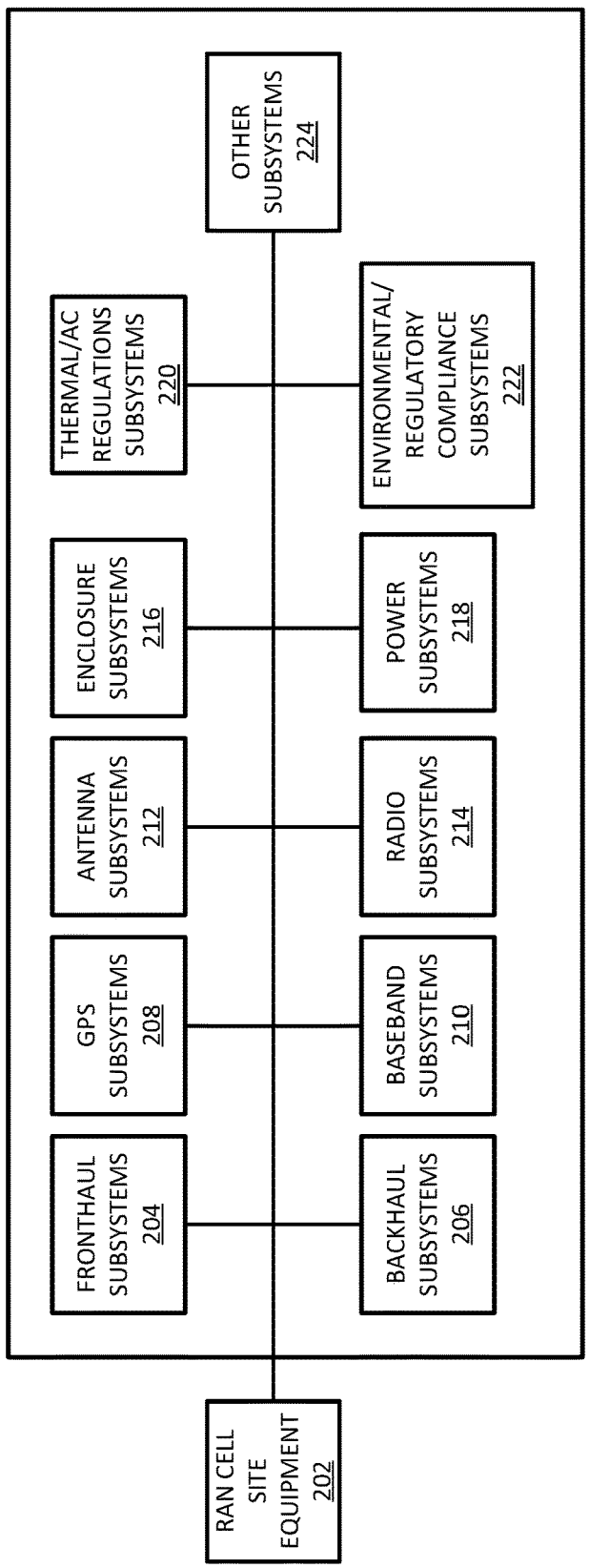
FIG. 2 depicts a block diagram of an example RAN cell site infrastructure equipment organized into one or more subsystems that may be remotely tested using an embodiment of a RAN cell site diagnostics system on behalf of an authorized test tool user entity.

As noted previously, an embodiment of the present invention may be configured to be invoked routinely, based on pre-defined event criteria such as product configuration changes, alarmed faults and KPI's and/or can be initiated as part of an on-demand test by a pre-registered human or machine user. Regardless of how DAE 126 is launched, one or more subsystems of a RAN cell site infrastructure may be tested, monitored, measured, diagnosed or otherwise acted upon for purposes of an embodiment of the present invention. FIG. 2 depicts a block diagram of an example RAN cell site infrastructure equipment at a system level 200 organized into one or more subsystems that may be remotely tested using an embodiment of a RAN cell site diagnostics system on behalf of an authorized test tool user entity. A site level component or block 202 is illustrative as a diagnostic functional aggregation of all devices, equipment, mechanisms, components, sub-components, etc., that may be partitioned into a plurality of subsystems that may vary depending on the RAN architecture, RAT domains being used, and the like. For instance, not all RAN cell site architectures may include fronthaul components. Further, depending on specific deployment requirements, some cell sites may or may not have various environmental/regulatory compliance equipment that may be required in certain situations or jurisdictions. Accordingly, at a general level, example system level block diagram 200 may be illustrated with the following subsystems: (i) fronthaul subsystems 204; (ii) backhaul subsystems 206; (iii) GPS/location subsystems 208; (iv) baseband subsystems 210; (v) antenna subsystems 212; (vi) radio subsystems 214; (vii) enclosure/chassis or cabinet housing subsystems 216; (viii) power/backup battery subsystems 218; (ix) thermal/AC/ambient climate control subsystems 220; (x) environmental/regulatory compliance subsystems 222; as well as other subsystems 224. Skilled artisans will recognize upon reference hereto that some of these subsystems may be combined or rearranged in different ways, e.g., depending on how an embodiment of the RAN cell site test tool system 122 is configured with respect to the various diagnostic functions relative to different types of RAN cell sites and RAT domains. In one arrangement, each of the example cell site subsystems 204-224 may be represented or otherwise identified as remote field diagnostic testable objects, e.g., by certain icons, pictograms, ideograms, hyperlinks, or other indicia, which may be presented via suitable graphical user interfaces for user selection at a test terminal with respect to a selected subsystem's diagnosis and analysis. Functionally, for purposes of diagnostics, each subsystem's icon may therefore be associated with or configured to launch a suite of diagnostic functions, tests, or protocols, containing a unique set of cause correlation and determination rules that may be invoked for detecting and diagnosing the particular subsystem. In one arrangement, a set of threshold values may be provided on a per subsystem, per component and/or per function basis, where customization of some of the monitoring points may be supported based on the cell site architecture and RAT domains.

As noted previously, test results and reports generated responsive thereto may also be stored in a database for operational and product quality reporting purposes. Accordingly, in one arrangement, the cause correlation and determination rules for each functional component or subsystem under test may be used by DAE 124 to predict, detect and diagnose potential and actual problems, as well as any predictive trends with respect to the monitored variables, parameters, status indicators, etc.

In a further arrangement, faults identified by the diagnostic routines may include and/or identify one or more troubleshooting procedures intended to assist a user to recover from the fault. Further, an embodiment of the present invention may also be configured to provide feedback for facilitating adaptive control/learning based on, e.g., user input/selection. For instance, when the RAN cell site test tool system 122 detects that a fault is successfully corrected, the user may be prompted to select from a list of recovery actions which best describes the actions performed to address the fault condition. This information may be input into the database and leveraged for quality improvement purposes as well as for adaptive learning purposes. In a further arrangement, an embodiment of the present invention may also be configured to provide a quality reporting function. For example, a user with a "Quality Management" role assignment may be allowed to generate various reports to measure installation quality and maintenance recovery success rates based on the lifecycle logs stored in the database.

Figure 6:
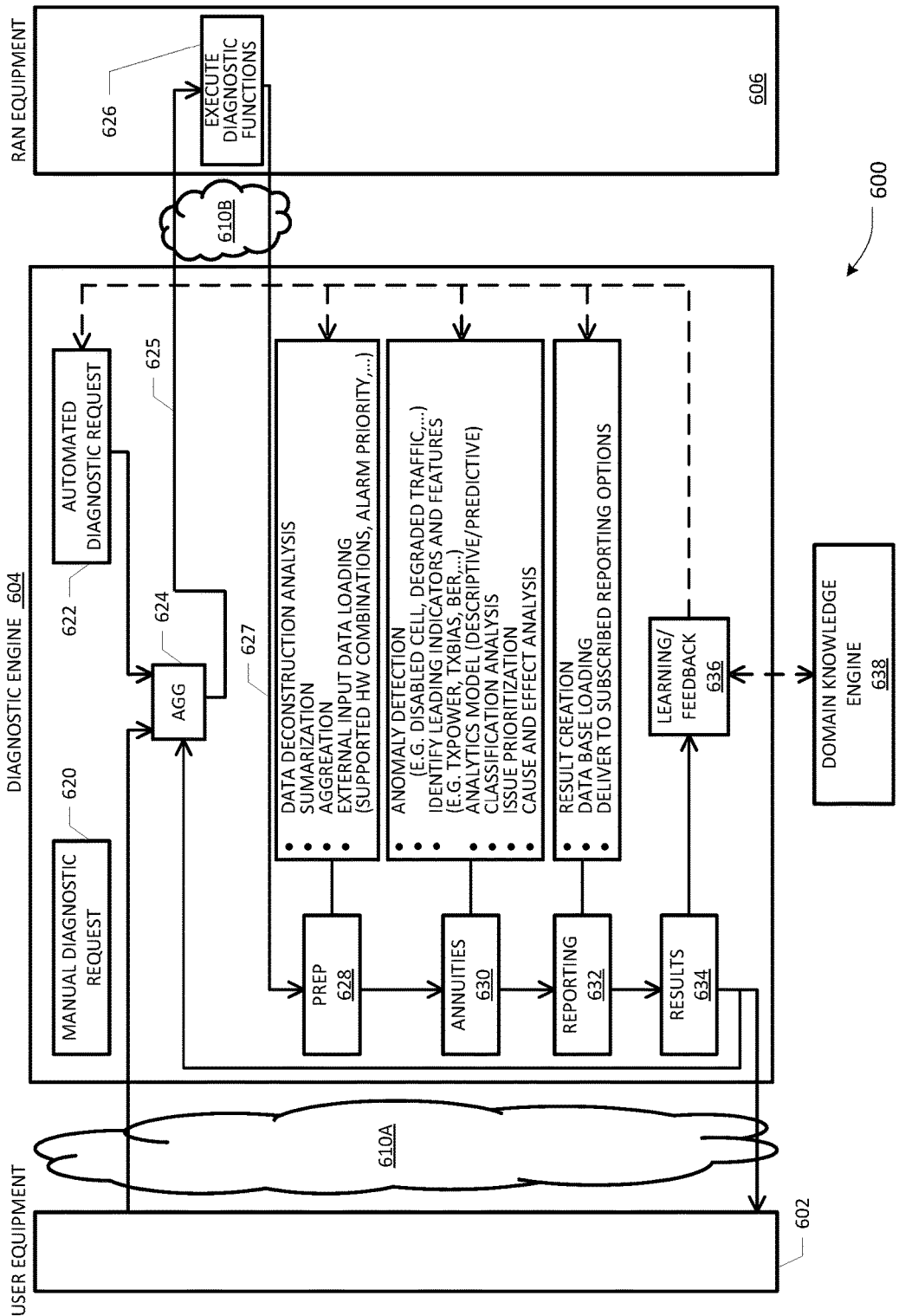
FIG. 6 depicts an example network environment illustrating interactions among a test tool user entity, cloud-based RAN cell site diagnostics platform and RAN cell site infrastructure equipment according to an embodiment.

Turning now to FIG. 6, depicted therein is a simplified example network environment 600 illustrating interactions among a test tool user entity/equipment 602, cloud-based RAN cell site diagnostics engine/platform 604 and RAN cell site infrastructure equipment 606 according to an embodiment, wherein network portions 610A and 610B represent respective network interfacing between user entity/equipment 602 and cloud-based RAN cell site diagnostics engine platform 604, and between cloud-based RAN cell site diagnostics engine platform 604 and RAN cell site equipment 606. A diagnostic request may be manually generated by the authorized user (as set forth at block 620), e.g., by selecting one or more RAN subsystem icons, or may comprise an automated diagnostic request (as set forth at block 622), e.g., triggered responsive to an event. A request intake aggregator (AGG) 624 is operative to initiate one or more suitable connections 625 to the cell site equipment 606, whereupon a collection process may be initiated for executing a suite of diagnostic functions 626 relative to the selected/triggered subsystems. Raw data measurements may be transferred or received upon execution of the tests from the cell site equipment 606 via transfer connection 627. As described in detail hereinabove, the received data measurements may be processed via a series of modules, e.g., preparation module 628, analytics module 630, reporting module 632, to generate or otherwise obtain final results 634.

By way of illustration, preparation module 628 is exemplified with a sequence of processes (not all necessarily performed or in order for purposes of an example embodiment) such as, e.g., data deconstruction, summarization, aggregation, external input data loading, etc. Analytics module 630 is likewise also exemplified with a sequence of processes, e.g., anomaly detection, identification of leading indicators and features (transmit power, transmit bias, bit error rate (BER, etc.)), classification analysis, and the like, as set forth in detail previously. Reporting module 632 is likewise configured with execution of processes for results generation, database loading, report delivery, etc. Final results 634 may be provided to the user entity/equipment 602 based on the delivery service profiles and access level privileges associated therewith. Overall, the diagnostics engine platform 604 may therefore be configured to perform the actions and analysis required for parsing input data, execution of data analytics and delivery of the site diagnostic results in an example embodiment of the present invention.

In a further arrangement, the site diagnostic results 634 may also be provided a learning/feedback mechanism 636 as previously noted in order to generate feedback control signals for ongoing/remaining diagnostic tests as well any of the individual modules associated with the diagnostics engine platform 604. For instance, suitable feedback control signals may be generated to any of the preparation module 628, analytics module 630, and/or reporting module 632 so as to modulate their respective functionalities for ongoing/remaining tests. Suitable feedback control signals may also be provided to automated diagnostic request generation (block 622). In a still further arrangement, the feedback control signals may be generated based on the site diagnostic results 634 for updating a domain knowledgebase engine 638 operative with the diagnostics engine platform 604.

Figure 3:
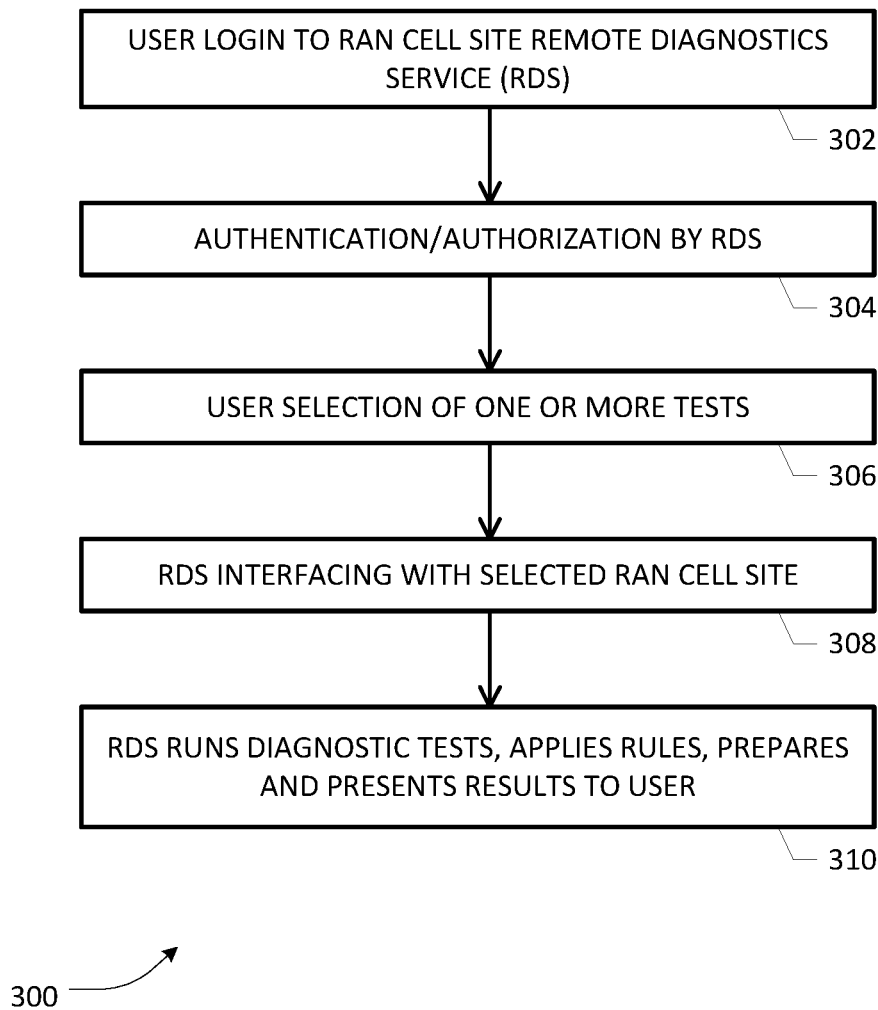
FIG. 3 is a flowchart illustrative of various blocks, steps and/or acts of a method that may be (re)combined in one or more arrangements, with or without blocks, steps and/or acts of additional flowcharts of the present disclosure, for effectuating an example RAN cell site diagnostics test management scheme at a cloud-based service center according to an embodiment.

FIG. 3 is a flowchart illustrative of various blocks, steps and/or acts of a method 300 that may be (re)combined in one or more arrangements, with or without blocks, steps and/or acts of additional flowcharts of the present disclosure, for effectuating an example RAN cell site diagnostics test management scheme at a remote diagnostics service center according to an embodiment. At block 302, a test tool user entity logs into a RAN cell site diagnostic analysis service, which may be hosted by a public cloud network, private cloud network, hybrid cloud network, an enterprise network, a service provider network, etc. At block 304, the test tool user entity is authenticated (e.g., the identity/credentials have been verified) and authorized (e.g., for one or more RAN cell site diagnostic services). Upon authentication and authorization, the test tool user entity selects one or more diagnostic tests (block 308), whereupon a diagnostics analysis engine (DAE) interacts and interfaces with the selected RAN cell site infrastructure (block 308). The remote diagnostics service then runs selected diagnostic tests, using unique sets of subsystem-specific or component-specific rules, as set forth at block 310. Further, the remote diagnostics service may also prepare and present the results to the test tool user entity one or more several means depending on the capabilities of the test tool terminal and delivery service options (block 310).

Figure 4:
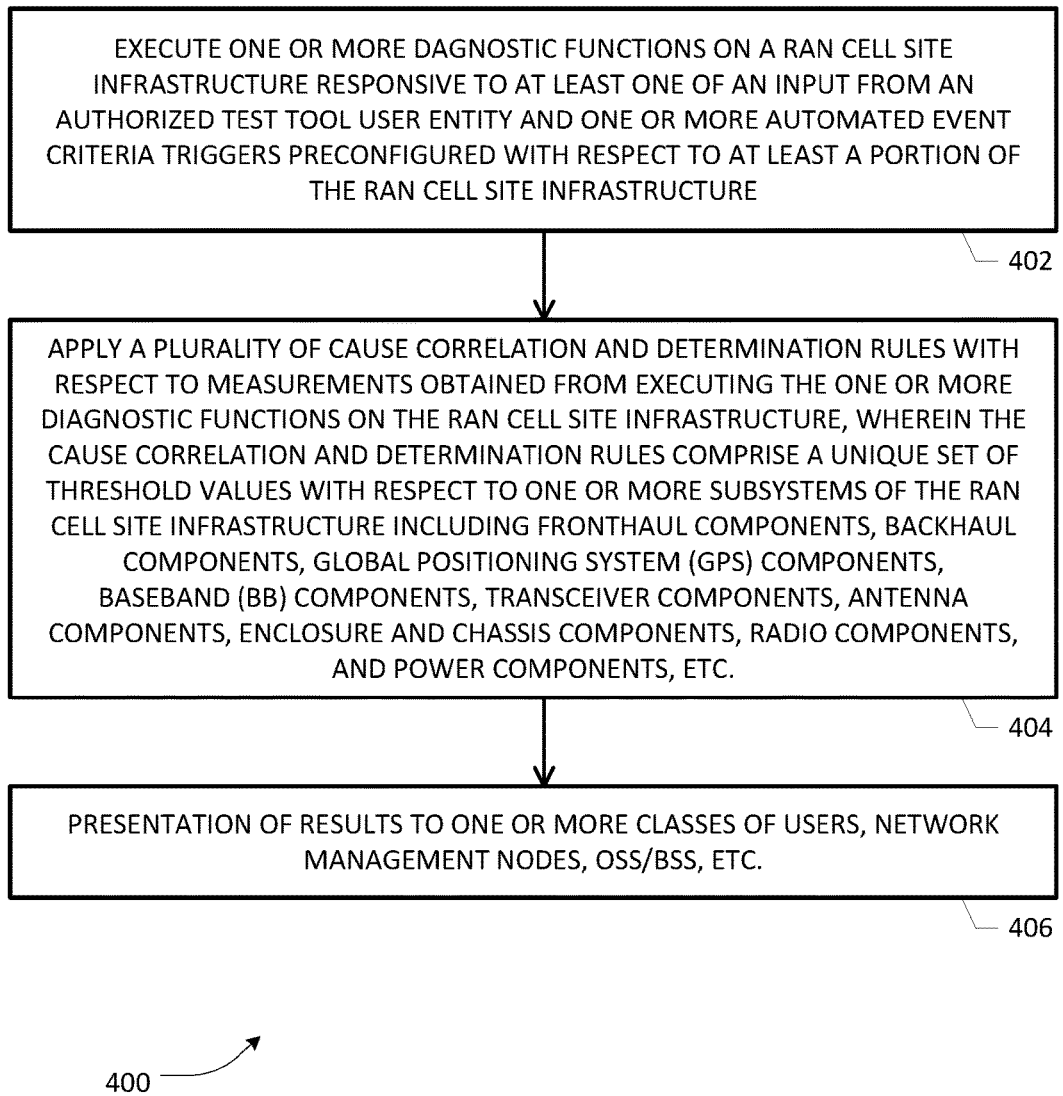
FIGS. 4 and 5 depict flowcharts illustrative of additional blocks, steps and/or acts that may be (re)combined in one or more arrangements, with or without blocks, steps and/or acts of additional flowcharts of the present disclosure, for effectuating an example RAN cell site diagnostics test methodology according to an embodiment.
Figure 5:
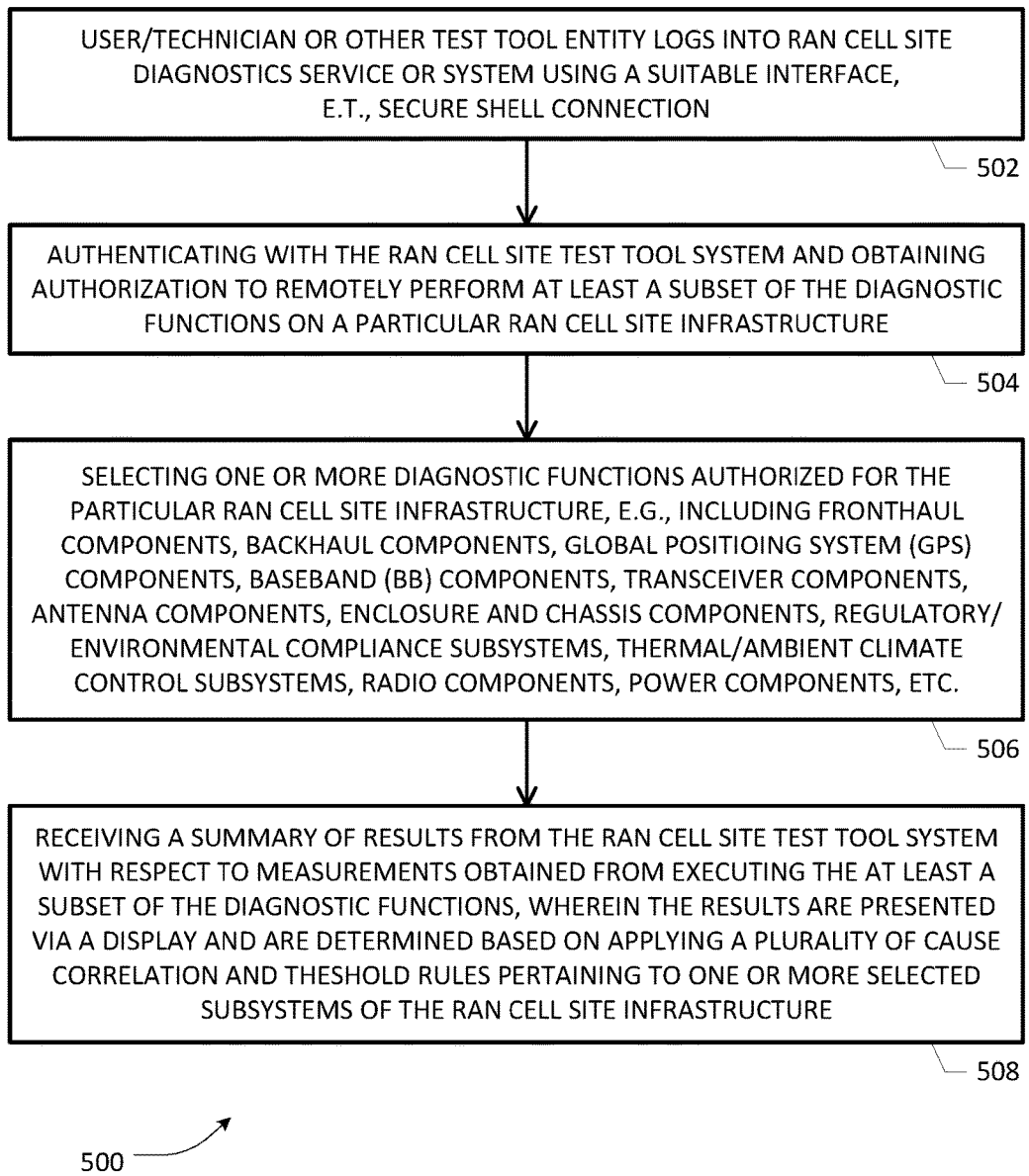

FIGS. 4 and 5 depict flowcharts illustrative of additional blocks, steps and/or acts that may be (re)combined in one or more arrangements, with or without blocks, steps and/or acts of additional flowcharts of the present disclosure, for effectuating an example RAN cell site diagnostics test management scheme according to an embodiment. More particularly, example process 400 of FIG. 4 sets forth blocks, steps and/or acts that may be performed at or by a DAE service node or platform, such as, e.g., DAE 124. Example process 500 of FIG. 5 likewise sets forth blocks, steps and/or acts that may be performed at or by a user or test tool entity. Skilled artisans will recognize that at least a portion of the foregoing processes 400, 500 may be combined into an embodiment of process 300 described hereinabove. Accordingly, the description of FIGS. 3-5 may be applied across the several embodiments depicted in these drawings, mutatis mutandis.

At block 402 of FIG. 4, one or more diagnostic functions may be executed on a RAN cell site infrastructure, e.g., on a per subsystem basis, responsive to at least one of an input from an authorized test tool user entity and one or more automated event criteria triggers preconfigured with respect to at least a portion of the RAN cell site infrastructure. At block 404, a plurality of cause correlation and determination rules may be applied with respect to measurements obtained from executing the one or more diagnostic functions on the RAN cell site infrastructure. In one example implementation, the cause correlation and determination rules may comprise a unique set of threshold values with respect to one or more subsystems of the RAN cell site infrastructure including fronthaul components, backhaul components, GPS components, baseband components, transceiver components, antenna components, radio components, enclosure and chassis components, and power components, local/ambient climate control components, etc. At block 406, results are obtained/generated based on the measurements, which are presented to the authorized test tool user entity, a network management node such as OSS/BSS, or a NOC node.

With respect to example process 500 of FIG. 5, a human user/technician or other test tool entity logs into a RAN cell site diagnostics service or system using a suitable remote user interface such as a web browser running SSL interface, e.g., a secure shell connection. At block 504, the user/technician or test tool agent presents suitable credentials for authenticating with the RAN cell site test tool system and for obtaining authorization to remotely perform at least a subset of the diagnostic functions on a particular RAN cell site infrastructure. The user/technician or test tool agent may then select one or more diagnostic functions authorized for the particular RAN cell site infrastructure by clicking or highlighting icons or pictograms associated with one or more subsystems of the RAN cell site, or by otherwise inputting user selection (block 506). At block 508, the user/technician or test tool agent is operative to a summary of results from the RAN cell site test tool system with respect to measurements obtained from executing the at least a subset of the diagnostic functions, wherein the results are presented via a display and are determined based on applying a plurality of cause correlation and threshold rules pertaining to one or more selected subsystems of the RAN cell site infrastructure.

Figure 7:
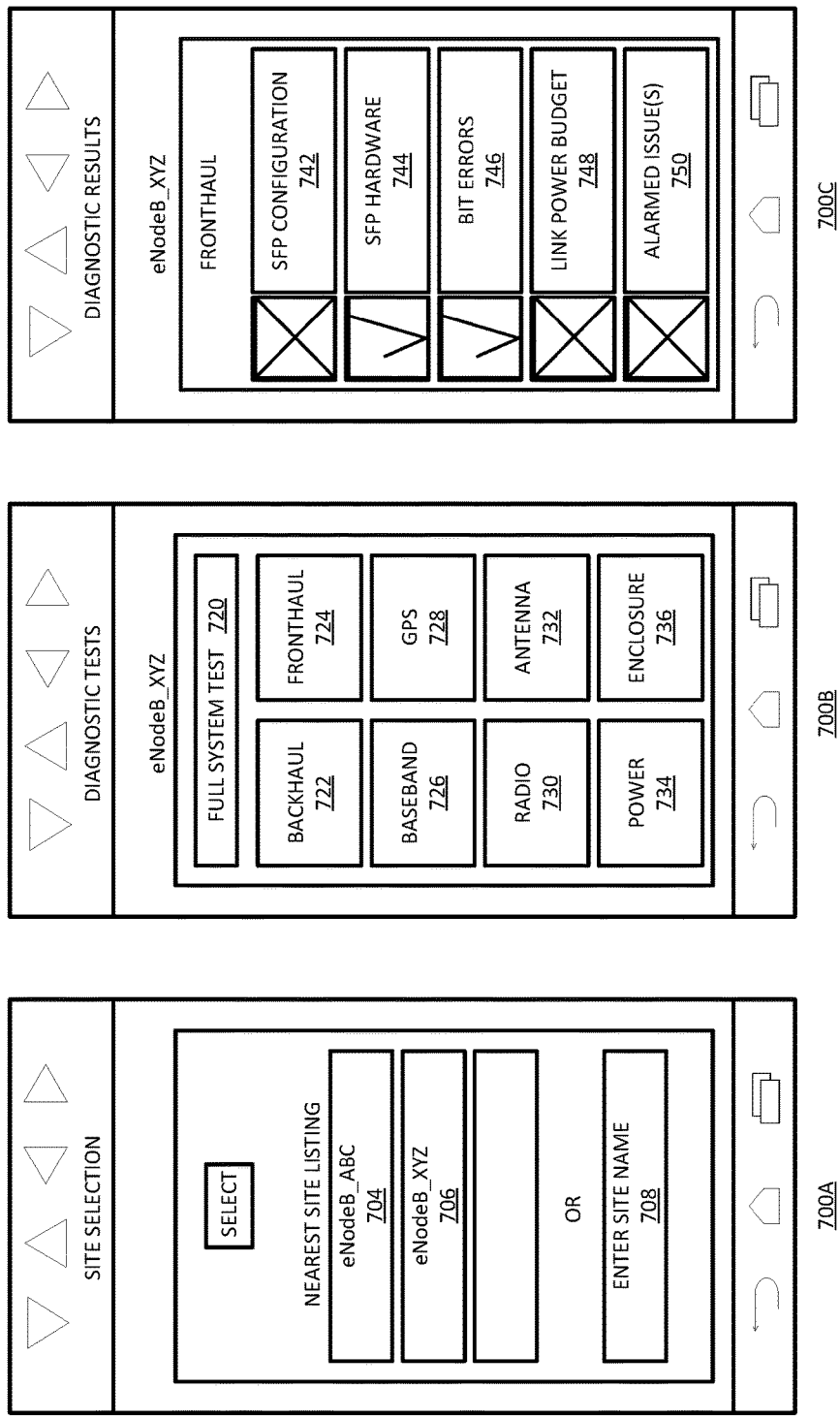
FIG. 7 depicts an example graphic user interface at a user terminal for selecting and launching RAN cell site diagnostic tests in an embodiment of the present invention.

As previously noted, a mobile terminal may be configured with suitable application software (e.g., as a mobile "app" extension provided by individual mobile network operators, third-party service providers, etc.) that may be launched for performing a suite of RAN diagnostic tests while remotely or near the cell site (e.g., by choosing to perform RAN diagnostics tests using a RAN cell site test tool system rather than physically testing the equipment onsite). It will be apparent that such an embodiment allows a field technician to perform on-demand diagnostic tests and interpret the results while in the field. The technicians may also be provided with an option to select from a list of sites based on their location proximity or they can enter the site name they wish to test manually. FIG. 7 depicts an example graphic user interface or display representations at a user terminal for selecting and launching RAN cell site diagnostic tests in an embodiment of the present invention. Reference numeral 700A refers to a display or menu window associated with a user terminal node for "Site Selection" that lists a plurality of cell sites 704, 706 closest to the location of a technician operating the user terminal, e.g., a mobile terminal having a RAN diagnostics app. Available menu options may also include a dialog box 708 where the technician may enter a site name to override the listed cell sites based on location (e.g., in ascending or descending order). Upon selecting/inputting a particular cell site, a plurality of icons, pictograms or other indicia may be presented via a display or window 700B for selecting various subsystem testing options 722-736 or a full system testing option 720. Skilled artisans will recognize that such system/subsystem icons may be presented in numerous ways, e.g., pull-down menus, dialog boxes, hierarchically nested icons or menus that may be interacted by way of swiping/touching/pointing, etc. Reference numeral 700C refers to a display or window for presenting or displaying a high level summary of diagnostic test results, e.g., for a fronthaul subsystem. A summary window 740 may include one or more icons or pictograms associated with the various functional/structural components of the fronthaul subsystem, wherein high level "Pass" or "Fail" results may be pictographically displayed. By way of illustration, summary window 740 depicts a Fail pictogram for SFP configuration component 742, a Pass pictogram for SFP hardware component 744, a Pass pictogram for Bit Errors component 746, a Fail pictogram for Link Power Budget component 748, and a Fail pictogram for Alarmed Issue(s) component 750, which may be associated with the fronthaul subsystem of the selected RAN cell site identified as eNode_XYZ.

Figure 8A:
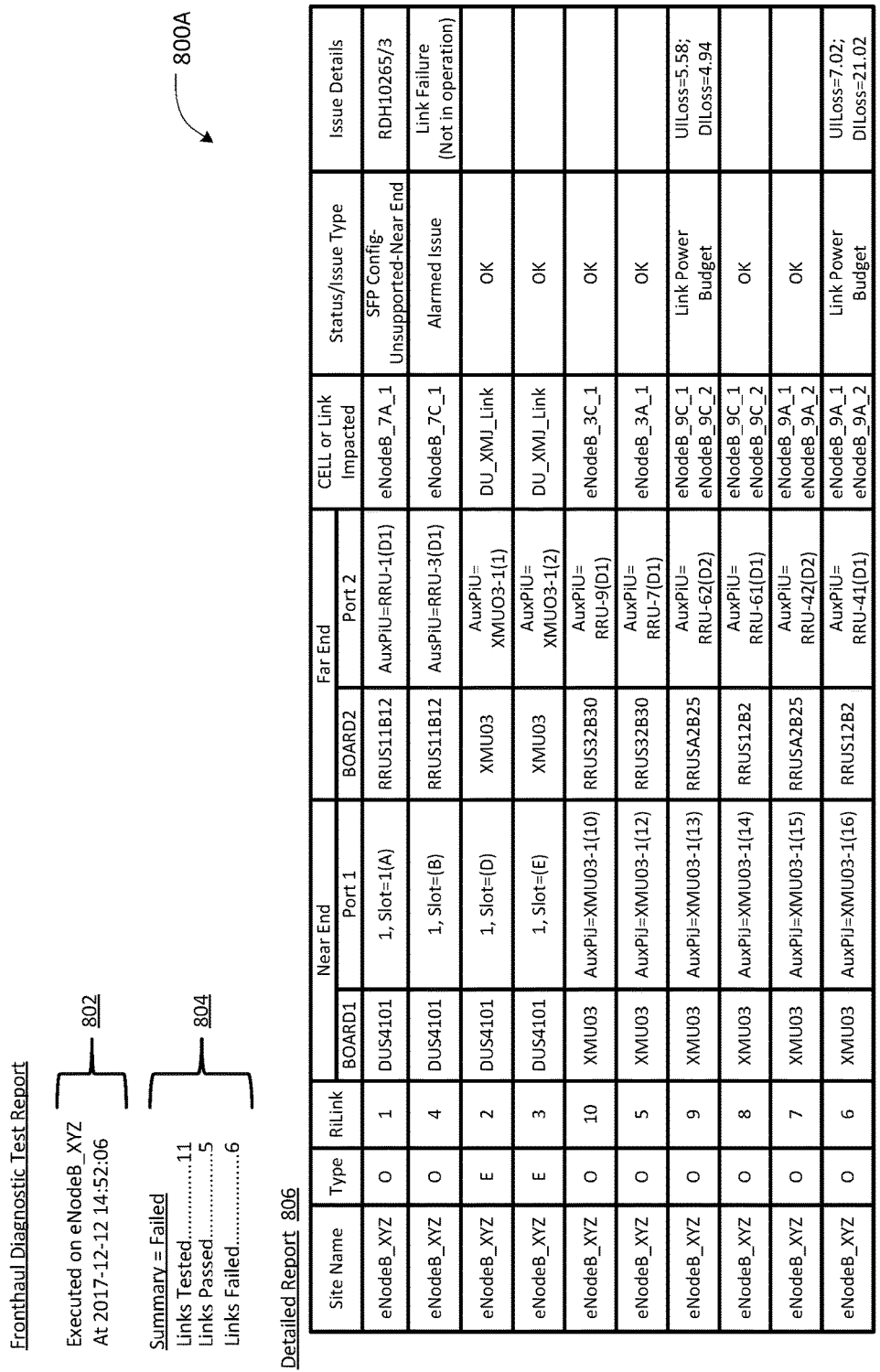

FIGS. 8A and 8B depict an example fronthaul diagnostics test report 800A/800B in an embodiment of the present invention, which may be presented to certain classes of test tool users having appropriate levels of reporting privileges and/or suitable test tool terminal equipment. Example test report 800A/800B may include identification of the RAN cell site and date/time stamp information 802 as to when the diagnostics are performed as well as a summary results portion 804 and a detailed report portion 808. Appropriate explanatory legend portions 807 comprising descriptive information for report fields 808 and/or status fields 810 may also be provided in an example embodiment.

In still further example embodiments, a portal view of RAN site diagnostic data may be presented wherein additional levels/layers of information may be displayed in multiple navigation panes, windows, etc., with overlays of maps, satellite/topographical images, and the like. For example, an example portal view may provide a Top Tool bar giving the user the ability to traverse to other views of the data; a Top Left frame which is a Map/Topography view of the equipment being tested, and potentially/optionally with color coding indicating the impacted service areas; a Bottom Left frame providing a table view displaying the details of the important collected data as well as the output results of the analytics and a Right frame visual representation of the component's connectivity and test results. An example portal view embodiment is set forth in Application No. 62/451,290, filed Jan. 27, 2017, which the present patent application claims priority to and benefit of, and is incorporated by reference hereinabove.

Figure 9:
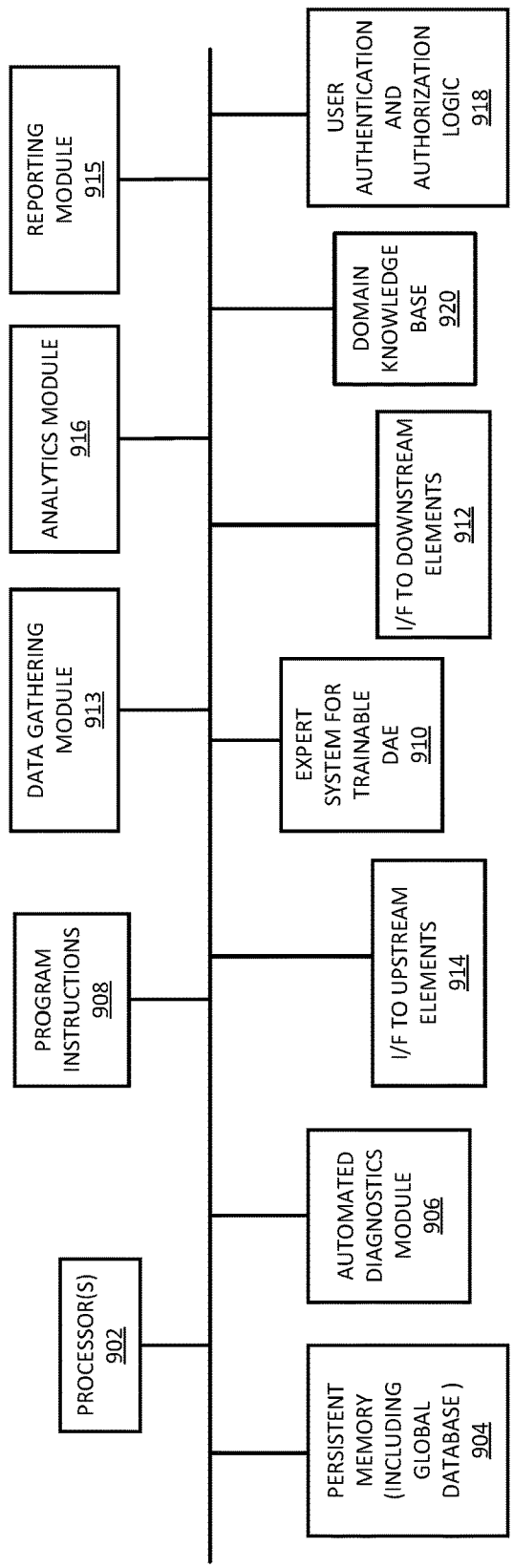
FIG. 9 depicts a block diagram of a computer-implemented apparatus that may be (re)configured and/or (re)arranged as a platform, node or element to effectuate an example RAN cell site diagnostics test management system according to an embodiment of the present invention.

Turning to FIG. 9, depicted therein is a block diagram of a computer-implemented apparatus 900 that may be (re) configured and/or (re)arranged as a platform, server, node or element to effectuate an example RAN cell site diagnostics test management system according to an embodiment of the present invention. One or more processors 902 may be operatively coupled to various modules that may be implemented in persistent memory for executing suitable program instructions or code portions with respect to effectuating various aspects of RAN cell site diagnostics test management, e.g., data collection, processing, preparation, reporting, administration, analytics, etc., as exemplified by modules 908, 913, 915, 916, 918. A persistent memory storage system 904 for storing RAN cell site diagnostics data and results may be provided as local storage associated with apparatus 900. An automated diagnostics module 906 may be configured to provide event driven or scheduled diagnostic requests to one or more RAN cell sites as set forth hereinabove. An expert system or engine 910 for training the overall DAE functionality may also included as part of apparatus 900, which may operate in conjunction with a RAT domain knowledgebase 920 in one arrangement. Depending on the actual implementation, appropriate "downstream" interfaces (I/F) 912 and/or "upstream" I/Fs 914 may be provided for effectuating a network fabric operative to connect with other databases, OSS/BSS nodes, NOCs, external Big Data analysis platforms, RAN cell site infrastructures, third-party authentication shell servers, various classes of test tool user entities, operator policy management nodes, as well as other cloud-based RAN diagnostic centers, etc. Accordingly, depending on the context, interfaces selected from interfaces 912, 914 may sometimes be referred to as a first interface, a second interface, and the like.

FIGS. 10A/10B illustrate connectivity between network devices (NDs) within an exemplary network, as well as three exemplary implementations of the NDs, according to some embodiments of the invention wherein at least a portion of the RAN cell site test tool system 122 and/or one or more RAN cell site infrastructure nodes shown in FIG. 1 may be implemented in a virtualized environment. In particular, FIG. 10A shows NDs 1000A-H, which may be representative of various servers, database nodes, authentication shell servers, external storage nodes, as well as other remote RAN diagnostic centers, virtualized RAN architectures (e.g., virtualized BBU/BTS/BSC functions), and the like, wherein example connectivity is illustrated by way of lines between A-B, B-C, C-D, D-E, E-F, F-G, and A-G, as well as between H and each of A, C, D, and G. As noted elsewhere in the patent application, such NDs may be provided as physical devices, and the connectivity between these NDs can be wireless or wired (often referred to as a link). An additional line extending from NDs 1000A, E, and F illustrates that these NDs may act as ingress and egress nodes for the network (and thus, these NDs are sometimes referred to as edge NDs; while the other NDs may be called core NDs).

Two of the exemplary ND implementations in FIG. 10A are: (1) a special-purpose network device 1002 that uses custom application—specific integrated—circuits (ASICs) and a proprietary operating system (OS); and (2) a general purpose network device 1004 that uses common off-the-shelf (COTS) processors and a standard OS.

The special-purpose network device 1002 includes appropriate hardware 1010 (e.g., custom or application-specific hardware) comprising compute resource(s) 1012 (which typically include a set of one or more processors), forwarding resource(s) 1014 (which typically include one or more ASICs and/or network processors), and physical network interfaces (NIs) 1016 (sometimes called physical ports), as well as non-transitory machine readable storage media 1018 having stored therein suitable application-specific software or program instructions 1020 (e.g., switching, routing, call processing, etc). A physical NI is a piece of hardware in an ND through which a network connection (e.g., wirelessly through a wireless network interface controller (WNIC) or through plugging in a cable to a physical port connected to a network interface controller (NIC)) is made, such as those shown by the connectivity between NDs 1000A-H. During operation, the application software 1020 may be executed by the hardware 1010 to instantiate a set of one or more application-specific or custom software instance(s) 1022. Each of the custom software instance(s) 1022, and that part of the hardware 1010 that executes that application software instance (be it hardware dedicated to that application software instance and/or time slices of hardware temporally shared by that application software instance with others of the application software instance(s) 1022), form a separate virtual network element 1030A-R. Each of the virtual network element(s) (VNEs) 1030A-R includes a control communication and configuration module 1032A-R (sometimes referred to as a local control module or control communication module) and forwarding table(s) 1034A-R with respect to suitable application/service instances 1033A-R, such that a given virtual network element (e.g., 1030A) includes the control communication and configuration module (e.g., 1032A), a set of one or more forwarding table(s) (e.g., 1034A), and that portion of the application hardware 1010 that executes the virtual network element (e.g., 1030A) for supporting one or more suitable application instances 1033A, e.g., suites of RAN diagnostics tests, component-specific cause correlation and determination rules and logic, DAE and components thereof as well as RAT domain knowledgebase instances, etc., in relation to a RAN cell site test tool virtualization.

In an example implementation, the special-purpose network device 1002 is often physically and/or logically considered to include: (1) a ND control plane 1024 (sometimes referred to as a control plane) comprising the compute resource(s) 1012 that execute the control communication and configuration module(s) 1032A-R; and (2) a ND forwarding plane 1026 (sometimes referred to as a forwarding plane, a data plane, or a bearer plane) comprising the forwarding resource(s) 1014 that utilize the forwarding or destination table(s) 1034A-R and the physical NIs 1016. By way of example, where the ND is a virtual RAN node, the ND control plane 1024 (the compute resource(s) 1012 executing the control communication and configuration module(s) 1032A-R) is typically responsible for participating in controlling how bearer traffic (e.g., voice/data/video) is to be routed. Likewise, ND forwarding plane 1026 is responsible for receiving that data on the physical NIs 1016 (e.g., similar to I/Fs 912 and 914 in FIG. 9) and forwarding that data out the appropriate ones of the physical NIs 1016 based on the forwarding information.

FIG. 10B illustrates an exemplary way to implement the special-purpose network device 1002 according to some embodiments of the invention, wherein an example special-purpose network device includes one or more cards 1038 (typically hot pluggable) coupled to an interconnect mechanism. While in some embodiments the cards 1038 are of two types (one or more that operate as the ND forwarding plane 1026 (sometimes called line cards), and one or more that operate to implement the ND control plane 1024 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway), etc.). By way of example, a service card may be used to terminate IPsec tunnels and execute the attendant authentication and encryption algorithms. These cards may be coupled together through one or more interconnect mechanisms illustrated as backplane 1036 (e.g., a first full mesh coupling the line cards and a second full mesh coupling all of the cards).

Returning to FIG. 10A, an example embodiment of the general purpose network device 1004 includes hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein software 1050, e.g., general purpose operating system software, similar to the embodiments set forth above in reference to FIG. 9 in one example. During operation, the processor(s) 1042 execute the software 1050 to instantiate one or more sets of one or more applications 1064A-R with respect to facilitating emergency call failure mitigation. While one embodiment does not implement virtualization, alternative embodiments may use different forms of virtualization—represented by a virtualization layer 1054 and software containers 1062A-R. For example, one such alternative embodiment implements operating system-level virtualization, in which case the virtualization layer 1054 represents the kernel of an operating system (or a shim executing on a base operating system) that allows for the creation of multiple software containers 1062A-R that may each be used to execute one of the sets of applications 1064A-R. In this embodiment, the multiple software containers 1062A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: (1) the virtualization layer 1054 represents a hypervisor (sometimes referred to as a virtual machine monitor (VMM)) or a hypervisor executing on top of a host operating system; and (2) the software containers 1062A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 1064A-R, as well as the virtualization layer 1054 and software containers 1062A-R if implemented, are collectively referred to as software instance(s) 1052. Each set of applications 1064A-R, corresponding software container 1062A-R if implemented, and that part of the hardware 1040 that executes them (be it hardware dedicated to that execution and/or time slices of hardware temporally shared by software containers 1062A-R), forms a separate virtual network element(s) 1060A-R.

The virtual network element(s) 1060A-R perform similar functionality to the virtual network element(s) 1030A-R—e.g., similar to the control communication and configuration module(s) 1032A and forwarding table(s) 1034A (this virtualization of the hardware 1040 is sometimes referred to as Network Function Virtualization (NFV) architecture, as mentioned elsewhere in the present patent application. Thus, NFV may be used to consolidate many network equipment types onto industry standard high volume server hardware, physical switches, and physical storage, which could be located in data centers, NDs, and customer premise equipment (CPE). However, different embodiments of the invention may implement one or more of the software container(s) 1062A-R differently. For example, while embodiments of the invention may be practiced in an arrangement wherein each software container 1062A-R corresponds to one VNE 1060A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 1062A-R to VNEs also apply to embodiments where such a finer level of granularity is used.

In certain embodiments, the virtualization layer 1054 includes a virtual switch that provides similar forwarding services as a physical Ethernet switch. Specifically, this virtual switch forwards traffic between software containers 1062A-R and the NIC(s) 1044, as well as optionally between the software containers 1062A-R. In addition, this virtual switch may enforce network isolation between the VNEs 560A-R that by policy are not permitted to communicate with each other (e.g., by honoring virtual local area networks (VLANs)).

The third exemplary ND implementation in FIG. 10A is a hybrid network device 1006, which may include both custom ASICs/proprietary OS and COTS processors/standard OS in a single ND or a single card within an ND. In certain embodiments of such a hybrid network device, a platform VM (i.e., a VM that implements the functionality of the special-purpose network device 1002) could provide for para-virtualization to the application-specific hardware present in the hybrid network device 1006 for effectuating one or more components, blocks, modules, and functionalities of a RAN cell site test/diagnostics tool system and associated data center infrastructure.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1030A-R, VNEs 1060A-R, and those in the hybrid network device 1006) receives data on the physical NIs (e.g., 1016, 1046) and forwards that data out the appropriate ones of the physical NIs (e.g., 1016, 1046).

Accordingly, various hardware and software blocks configured for effectuating an example RAN cell site test/diagnostics tool system may be embodied in NDs, NEs, NFs, VNE/VNF/VND, virtual appliances, virtual machines, and the like, as well as electronic devices and machine-readable media, which may be configured as any of the apparatuses described herein (e.g., without limitation, FIGS. 1, 9 and 10A/10B). One skilled in the art will therefore recognize that various apparatuses and systems with respect to the foregoing embodiments, as well as the underlying network infrastructures set forth above may be architected in a virtualized environment according to a suitable Network Function Virtualization (NFV) architecture in additional or alternative embodiments of the present patent disclosure. For instance, various physical resources, databases, services, applications and functions supported in a RAN cell site diagnostics test center set forth hereinabove may be provided as virtual appliances, machines or functions, wherein the resources and applications are virtualized into suitable VNFs) or virtual network elements (VNEs) via a suitable virtualization layer whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Additionally, as storage and processing of large amount of data, referred to hereinabove as Big Data, is becoming more and more important, even in real-time applications, Big Data analysis 148 as well as RAT-specific domain knowledgebase engine 140 may also be cloud-based and/or suitably virtualized. Storing and processing of large and complex data from e.g., sensors and devices in the RAN site can use access distributed systems for analytics, collection, search, sharing, storage, transfer, anonymization and virtualization. For instance, while data analytics as such is not a cloud technology, its implementation often is, especially if the data handled is large. An embodiment of the invention may therefore be configured to access data stored in distributed storage. Distributed, large scale processing on commodity hardware often involves technologies for storage and processing on clusters of commodity hardware, such as, e.g., Hadoop, HBase, Spark and Storm, etc.

Furthermore, skilled artisans will also appreciate that an example cloud-based RAN cell site diagnostics center environment may comprise one or more of private clouds, public clouds, hybrid clouds, community clouds, distributed clouds, multiclouds and interclouds (e.g., "cloud of clouds"), and the like.

Figure 11:
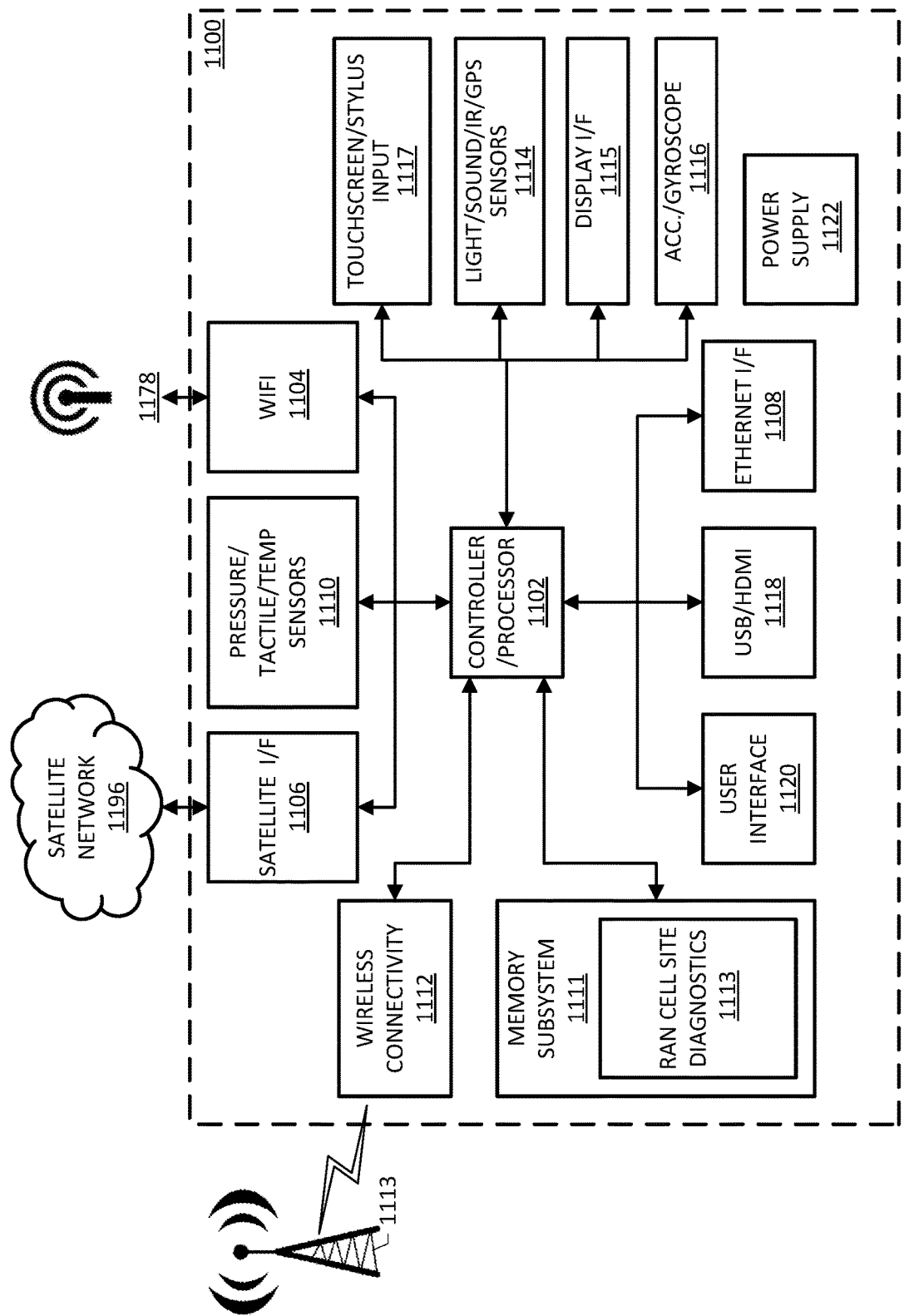
FIG. 11 depicts an example user terminal configured for launching an example RAN cell site diagnostics test system for remotely testing, monitoring, and diagnosing a selected RAN cell site according to an embodiment of the present invention.

FIG. 11 depicts an example user terminal 1100 configured for launching an example RAN cell site diagnostics test system for remotely testing, monitoring, and diagnosing a selected RAN cell site according to an embodiment of the present invention. In general, terminal 1100 may be arranged, rearranged or reconfigured as a RAN test tool terminal node operating as equipment associated with the various classes test tool user entities described hereinabove, and may include appropriate hardware/software components and subsystems configured for performing any of the device-side processes (either individually or in any combination thereof) with respect to launching a RAN diagnostics application/agent, generating diagnostic test requests, and receiving various types of RAN test results and reports in a number of ways depending on implementation and service level privileges. One or more microcontrollers/processors 1102 are provided for the overall control of RAN test tool terminal node 1100 and for the execution of various stored program instructions embodied in a persistent memory 1113 as a RAN cell site diagnostics agent in addition to appropriate client-side applications that may be part of a memory subsystem 1111 of the device. Controller/processor complex referred to by reference numeral 1102 may also be representative of other specialty processing modules such as graphic processors, video processors, digital signal processors (DSPs), and the like, operating in association with suitable video and audio interfaces (not specifically shown). Appropriate interfaces such as WiFi I/F modules 1104 and satellite network I/F modules 1106 involving tuners, demodulators, descramblers, etc. may be included for processing and interfacing with various short-range wireless and satellite communications networks, e.g., as representatively shown at reference numerals 1178, 1196, respectively. Example sensors associated with RAN test tool terminal node 1100 may include, depending on whether implemented as a tablet, phablet, smartphone, smart wearable, netbook computer, notebook computer, customized data entry pad, telecom technician toolkit, laptop computer, desktop computer, palmtop/handheld computer, etc., one or more of the following: optical, sound, IR, location-based (GPS) sensors 1114, accelerometer/inclinometer/gyroscope 1116, as well as pressure, tactile, thermal sensors 1110, etc. Additional sensory instrumentation may comprise gesture sensors/controllers, optical scanners, near-field communications (NFC) devices, head/hand movement detectors, ocular movement trackers, face recognition, and directional sensors such as solid-state compasses. Other I/O or interfaces such as a display interface 1115, touch-screen/stylus input interface 1117, augmented/virtual reality (AR/VR) user interface 1120, USB/HDMI ports 1118, Ethernet I/F 808, and wide area wireless connectivity interfaces 1112 for connecting with suitable RAN infrastructures 1113 are also provided. Although not specifically shown, a local storage may be included for storing RAN cell site diagnostic test results and reports. RAN test tool terminal node 1100 may also comprise is a suitable power supply block 1122, which may include AC/DC power conversion to provide power for the device 1100. It should be appreciated that the actual power architecture for RAN test tool terminal node 1100 may vary by the hardware platform used, e.g., depending upon the core SoC (System on Chip), memory, analog front-end, analog signal chain components and interfaces used in the specific platform, and the like.

Skilled artisans will recognize that embodiments set forth herein provide several benefits. First, since there is no intrusive field testing, RAN diagnostics of the present invention nearly eliminates service disruptions in a mobile network. As the diagnostic functions may be performed at various levels of component/functional granularity and modularity, with data aggregations being available at different levels, a comprehensive consolidated diagnostic system status and quality management reports (at site level as well as on per subsystem basis) may be provided to the technicians, network managers, NOC personnel, etc. Further, as there is no physical handling of the cell site plant, e.g., fiber installation, there is no risk of faults or errors being introduced during troubleshooting due to contamination from incorrect handling. Due to the availability of real-time diagnostic troubleshooting, suitable feedback may be provided to the field engineer to drive appropriate behavioral improvements while on site. Additional benefits relate to, inter alia, logging and storing diagnostic logs in a database for analytical report purposes; automatic generation and storage of high-level, high value reports such as Product Quality Site Failure Note, Product Return Toe-Tag form and/or log records; generation of periodic Quality Reports to measure field installation quality and operational recovery effectiveness; documentation and recording of per failure mode recovery effectiveness, field engineer or contract company quality performance, etc. such that the cost of poor performance in an mobile operator network may be readily quantified.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a ROM circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, microcode, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

The invention claimed is:

1. A radio access network (RAN) cell site test tool system, comprising:

a diagnostic analytics engine configured to execute one or more diagnostic functions on a RAN cell site infrastructure responsive to at least one of an input from an authorized test tool user entity and one or more automated event criteria triggers preconfigured with respect to at least a portion of the RAN cell site infrastructure; and a domain knowledgebase engine operative to apply a plurality of cause correlation and determination rules with respect to measurements obtained from executing the one or more diagnostic functions on the RAN cell site infrastructure, wherein the domain knowledgebase engine is configured with an adaptive learning expert system having technology-specific expertise for different radio access technology (RAT) infrastructures selected from one or more of a Global System for Mobile Communications (GSM) radio access network (GRAN) technology, an Enhanced Data Rates for Global System for Mobile Communications (GSM) Evolution (EDGE) network (GERAN) technology, a $3^{rd}/4^{th}/5^{th}$ Generation Partnership Project (3/4/5 GPP) network technology, an Integrated Digital Enhanced Network (IDEN) technology, a WiMAX technology, a heterogeneous access network technology, a Code Division Multiple Access (CDMA) network technology, a Universal Mobile Telecommunications System (UMTS) network technology, a Universal Terrestrial Radio Access Network (UTRAN) technology, an All-IP Next Generation Network (NGN) technology, and a Long Term Evolution (LTE) technology, and wherein the cause correlation and determination rules comprise a unique set of threshold values with respect to one or more subsystems of the RAN cell site infrastructure including fronthaul components, backhaul components, Global Positioning System (GPS) components, baseband (BB) components, climate control components, antenna components, radio components, enclosure and chassis components, regulatory compliance components, and power components, and further wherein the cause correlation and determination rules are adaptively learned with respect to each of the different RAT infrastructures.

2. The RAN cell site test tool system as recited in claim 1, further comprising an output module configured to effectuate reporting and presentation of results generated from applying the plurality of cause correlation and determination rules with respect to the measurements obtained from executing the one or more diagnostic functions on the RAN cell site infrastructure.

3. The RAN cell site test tool system as recited in claim 1, wherein the test tool user entity is at least of a human technician operating a mobile equipment device, a network operations center (NOC) operator, and an automated machine tool server disposed at a telecommunications operator's operations support system (OSS).

4. The RAN cell site test tool system as recited in claim 1, further comprising a computer readable storage medium for storing results generated from applying the plurality of cause correlation and determination rules with respect to the measurements obtained from executing the one or more diagnostic functions on the RAN cell site infrastructure.

5. The RAN cell site test tool system as recited in claim 1, further comprising an authorization module configured to provide access control rules to restrict users from obtaining direct access to a RAN cell site infrastructure subsystem.

6. The RAN cell site test tool system as recited in claim 1, wherein the diagnostic analytics engine and the domain knowledgebase engine are configured as part of a private cloud network, a public cloud network, or a hybrid cloud network.

7. The RAN cell site test tool system as recited in claim 1, wherein the RAN cell site infrastructure comprises at least one of a small cell RAN infrastructure and a macrocell RAN infrastructure, and a heterogeneous access network infrastructure.

8. A non-transitory machine-readable storage medium having program instructions thereon, which are configured to perform following acts when executed by one or more processors of a cloud-based radio access network (RAN) cell site test tool system:
  execute one or more diagnostic functions on a RAN cell site infrastructure responsive to at least one of an input from an authorized test tool user entity and one or more automated event criteria triggers preconfigured with respect to at least a portion of the RAN cell site infrastructure; and
  apply a plurality of cause correlation and determination rules, using a domain knowledgebase engine, with respect to measurements obtained from executing the one or more diagnostic functions on the RAN cell site infrastructure,
  wherein the domain knowledgebase engine is configured with an adaptive learning expert system having technology-specific expertise for different radio access technology (RAT) infrastructures selected from one or more of a Global System for Mobile Communications (GSM) radio access network (GRAN) technology, an Enhanced Data Rates for Global System for Mobile Communications (GSM) Evolution (EDGE) network (GERAN) technology, a $3^{rd}/4^{th}/5^{th}$ Generation Partnership Project (3/4/5 GPP) network technology, an Integrated Digital Enhanced Network (IDEN) technology, a WiMAX technology, a heterogeneous access network technology, a Code Division Multiple Access (CDMA) network technology, a Universal Mobile Telecommunications System (UMTS) network technology, a Universal Terrestrial Radio Access Network (UTRAN) technology, an All-IP Next Generation Network (NGN) technology, and a Long Term Evolution (LTE) technology,
  and wherein the cause correlation and determination rules comprise a unique set of threshold values with respect to one or more subsystems of the RAN cell site infrastructure including fronthaul components, backhaul components, Global Positioning System (GPS) components, baseband (BB) components, climate control components, antenna components, radio components, enclosure and chassis components, regulatory compliance components, and power components, and further wherein the cause correlation and determination rules are adaptively learned with respect to each of the different RAT infrastructures.

9. The non-transitory machine-readable storage medium as recited in claim 8, further comprising program instructions configured to effectuate reporting and presentation of results generated from applying the plurality of cause correlation and determination rules with respect to the measurements obtained from executing the one or more diagnostic functions on the RAN cell site infrastructure.

10. The non-transitory machine-readable storage medium as recited in claim 8, further comprising computer program instructions configured to provide access control rules to restrict users from obtaining direct access to a RAN cell site infrastructure subsystem.

11. A radio access network (RAN) test tool terminal node, comprising:
  a processor;
  a network interface;
  a display; and
  a persistent memory coupled to the processor and having instructions thereon for performing the following acts when executed by the processor:
    effectuating a secure connection via the network interface to a RAN cell site test tool system that comprises a diagnostic analytics engine configured to execute a plurality of diagnostic functions on one or more RAN cell site infrastructures;
    authenticating with the RAN cell site test tool system and obtaining authorization to remotely perform at least a subset of the diagnostic functions on a select RAN cell site infrastructure; and
    receiving a summary of results from the RAN cell site test tool system with respect to measurements obtained from executing the at least a subset of the diagnostic functions, wherein the results are presented via the display and are determined based on applying a plurality of cause correlation and threshold rules pertaining to one or more subsystems of the select RAN cell site infrastructure by a domain knowledgebase engine,
  wherein the domain knowledgebase engine is configured with an adaptive learning expert system having technology-specific expertise for different radio access technology (RAT) infrastructures selected from one or more of a Global System for Mobile Communications (GSM) radio access network (GRAN) technology, an Enhanced Data Rates for Global System for Mobile Communications (GSM) Evolution (EDGE) network (GERAN) technology, a $3^{rd}/4^{th}/5^{th}$ Generation Partnership Project (3/4/5 GPP) network technology, an Integrated Digital Enhanced Network (IDEN) technology, a WiMAX technology, a heterogeneous access network technology, a Code Division Multiple Access (CDMA) network technology, a Universal Mobile Telecommunications System (UMTS) network technology, a Universal Terrestrial Radio Access Network (UTRAN)

technology, an All-IP Next Generation Network (NGN) technology, and a Long Term Evolution (LTE) technology, and wherein the cause correlation and determination rules comprise a unique set of threshold values with respect to one or more subsystems of the select RAN cell site infrastructure including fronthaul components, backhaul components, Global Positioning System (GPS) components, baseband (BB) components, climate control components, antenna components, radio components, enclosure and chassis components, regulatory compliance components, and power components, and further wherein the cause correlation and determination rules are adaptively learned with respect to each of the different RAT infrastructures.

12. The RAN test tool terminal node as recited in claim 11, wherein the network interface comprises one of a wireless communications interface and a wired communications interface.

13. The RAN test tool terminal node as recited in claim 11, wherein the diagnostic analytics engine and the domain knowledgebase engine are configured as part of a private cloud network, a public cloud network, or a hybrid cloud network.

14. The RAN test tool terminal node as recited in claim 11, wherein the node is at least one of a smartphone, a laptop computer, a palmtop computer, a smart wearable device, a netbook computer, a notebook computer, a desktop computer, a RAN tool server machine, a tablet device, a phablet device, and a custom RAN test tool device.

15. The RAN test tool terminal node as recited in claim 11, wherein the select RAN cell site infrastructure comprises at least one of a small cell RAN infrastructure, a macrocell RAN infrastructure, and a heterogeneous access network infrastructure.

* * * * *